United States Patent [19]

Agarwal et al.

[11] Patent Number: 5,254,920
[45] Date of Patent: Oct. 19, 1993

[54] SEEK SYSTEM FOR SECTOR SERVO DISK DRIVE

[75] Inventors: Vinay K. Agarwal, Santa Clara; Dan Cautis, San Mateo, both of Calif.

[73] Assignee: Western Digital (Singapore) Pte. Ltd., Singapore

[21] Appl. No.: 715,511

[22] Filed: Jun. 14, 1991

[51] Int. Cl.$^5$ ............................................. G05B 11/01
[52] U.S. Cl. .................................... 318/560; 318/571; 318/626
[58] Field of Search ........................ 318/560, 571, 626

[56] References Cited

U.S. PATENT DOCUMENTS

| 3,749,996 | 7/1973 | Pomella et al. | 318/571 |
| 4,009,428 | 2/1977 | Sawyer | 318/571 |
| 4,297,734 | 10/1981 | Laishley et al. | 360/78 X |
| 4,914,725 | 4/1990 | Belser et al. | 318/560 X |
| 5,004,968 | 4/1991 | Mizuno et al. | 318/615 X |

Primary Examiner—William M. Shoop, Jr.
Assistant Examiner—Karen Masih
Attorney, Agent, or Firm—Skjerven, Morrill, MacPherson, Franklin & Friel

[57] ABSTRACT

A servo system moving a transducer between tracks in a sector servo disk drive generates a velocity profile representing the variation of the desired velocity of the head in moving from a first track to a second track. The velocity profile has an acceleration phase and deceleration phase, with the transition from acceleration phase to deceleration phase identified as a switch point.

The velocity of movement of the head is periodically sampled from the sector servo pattern in a sequence of sample periods during movement of the head. The energization of the head moving element is controlled so that the switch point occurs during one of the sample periods, thereby resulting in improved performance in positioning the head at the desired track. The system accommodates itself to variations, such as mechanical or electrical disturbances, which would otherwise affect the system.

2 Claims, 4 Drawing Sheets

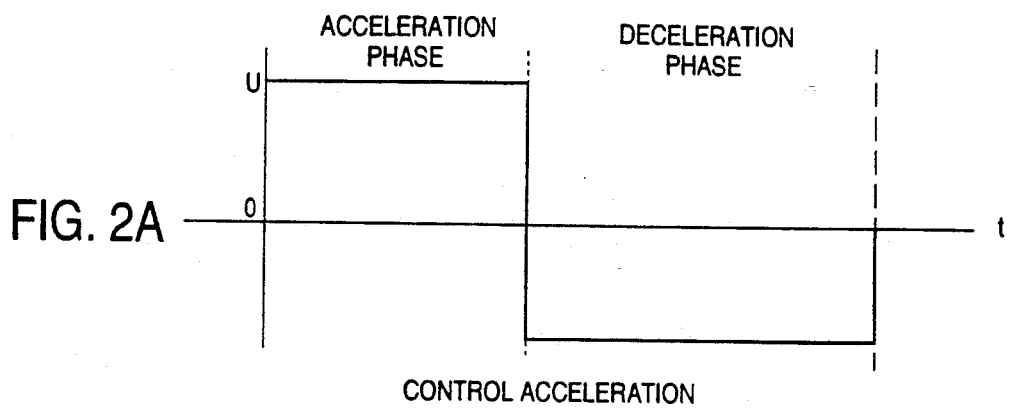
FIG. 2A — CONTROL ACCELERATION
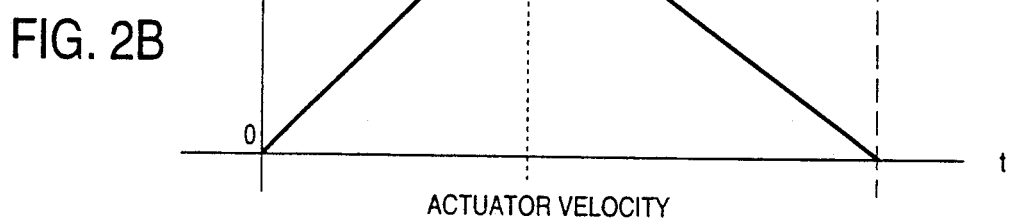
FIG. 2B — ACTUATOR VELOCITY
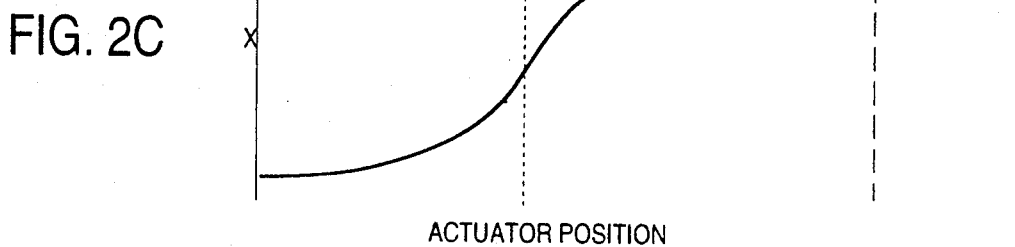
FIG. 2C — ACTUATOR POSITION
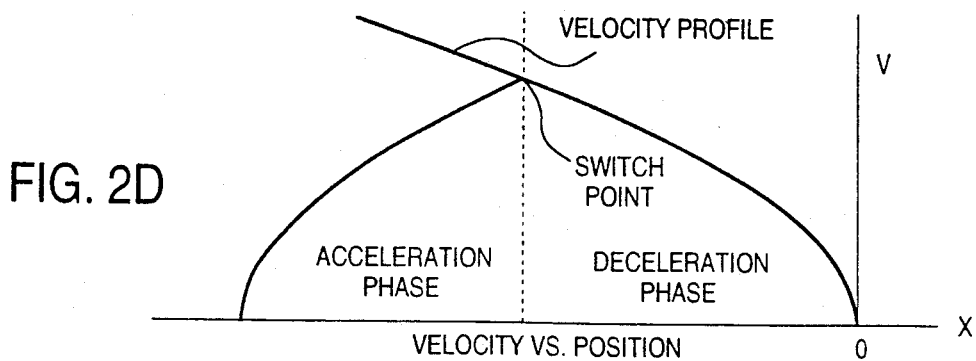
FIG. 2D — VELOCITY VS. POSITION REPRESENTATIVE PLOTS OF
REQUIRED DECELERATION VS.
CHANGE OF REQUIRED DECELERATION.

SEEK SYSTEM FOR SECTOR SERVO DISK DRIVE

BACKGROUND OF THE INVENTION

1. Field of the Invention

This invention relates in general to servo systems for disk drives, and relates more particularly to seek systems for use in such disk drives employing sector servo patterns.

2. Prior Art

In current disk drive systems, it is common to employ some type of servo system to position one or more heads at a desired one of a plurality of concentric recording tracks on a rotating recording disk surface and to maintain the head centered over the desired track during reading or writing of data in the desired track. Such servo systems operate in two modes, the first of which is called track seeking, in which a head actuator system moves the head or heads from the current track position to the desired or target track position. During this phase of the servo system operation, seek algorithms are employed to control the acceleration and deceleration of the actuator to optimize the time required for the head to reach the desired track. The optimum acceleration and deceleration values generated by the seek algorithm, as well as the seek time, will be a function of the "distance-to-go" or number of tracks to be crossed to reach the desired track.

In the second mode of operation, after the head reaches the target track, the servo system operates in a track following mode to maintain the head centered over the target track for reading or writing of data.

The time taken to move a head between tracks in a disk drive is one of the elements of what is known as the "access" time and is one of the most important performance characteristics of a disk drive. To minimize the access time for a drive of given mechanical configuration and actuator performance requires an access motion control system which will control the velocity of the head in time optimal fashion and which will bring the head accurately to rest on the desired track.

The access motion is, therefore, necessarily of wide bandwidth and the access control system is subject to the stability and error constraints of such systems. Conventionally, these wide band requirements have necessitated the use of a continuous position reference source such as a separate servo surface. In such a system, near time-optimal access motion has been accomplished by means of a derived continuous distance-to-go signal acting on a reference velocity curve generator which, via a high gain closed loop, forces the actual velocity of the head to follow a time-optimal reference velocity profile from the curve generator.

In a typical velocity servo loop type of seek algorithm, the actuator is accelerated in the direction of target track with maximum available acceleration during the acceleration phase as shown in FIG. 2A, until it attains the desired velocity for deceleration. This is called the switch point. Then the actuator is decelerated in a controlled fashion, as also shown in FIG. 2A, so that it comes to rest at the target track. At all times during deceleration, the velocity of the actuator is controlled close to a desired velocity, and a curve representing this velocity is called the desired velocity profile as shown in FIG. 2D. The desired velocity decreases with the distance to the target, reaching zero at the target track. Plots of actuator velocity and actuator position as functions of time are shown in FIGS. 2B and 2C, respectively.

This conventional approach is not available with a sector servo system, where position information is interspersed circumferentially on the disk surface with blocks of data, since direct head position and velocity information is available only at the periodically occurring servo sampling times. It is thus difficult to reconcile the use of sector servo in a disk drive with low access times.

Various access control schemes for sector servo disk drives have been proposed in the prior art. One of these, described in U.S. Pat. No. 4,103,314 "Motion Control System", is an access control system in which the actuator is energized to cause the head to follow a constant velocity portion of a desired velocity profile. The constant velocity is such that the passage of the head over track centers is synchronized with the timing of the servo sectors. The normal servo sector position error signal, as also generated during track following, may thus be used during the access motion to keep the velocity constant.

During brief initial acceleration and final deceleration stages of the motion in this prior art system, the full power supply voltage is applied to the actuator under open loop conditions. The motion of the head during an access does not approach time optimal motion since it is at constant velocity over all but a few tracks. The constant velocity is low, since the head traverses only one track per two sector periods and must be synchronized with the sector frequency. Furthermore, only in a low velocity system is it possible to effect the final deceleration under open loop conditions without significant final position error.

Another access control system for a sector servo disk drive is described in U.K. Pat. No. 1,527,950. This patent employs the so-called "bang-bang" technique of controlling head motion in which the maximum available power is used for both acceleration and deceleration. The system is switched between full forward power and full reverse power at a point which is calculated from the initial and target track addresses. The servo sectors are coded with track address information which is read by the head during the access motion and used to determine when the power is to be reversed. Although allowing the highest possible speeds to be attained during access motion, the described system does not employ any form of closed loop control during acceleration and deceleration. The position of the head when it comes to rest is thus unknown until a comparison can be made of the actual address of the track over which the head is most nearly situated with the target address. There is provision for a further shift of the head if the two addresses are not equal, but such shifts would add to the average access time.

Although most disk drives employing a sector servo system use a velocity servo loop for track seeking operation, many difficulties arise in its implementation. A schematic representation of one such prior art velocity servo loop is shown in FIG. 3A. Such a servo system is a type 1 servo system which has the property of not being able to follow varying input (velocity in the present case). A solution to this problem must be found, since during deceleration the actuator velocity must be maintained close to the desired velocity from the velocity profile.

To solve this problem, another acceleration component, called feed-forward, is added as shown in FIG.

3B. Typically, the value of feed-forward is calculated for ideal conditions and is not adapted for variations.

Another difficulty encountered in sector servo implementations is determining the proper acceleration-to-deceleration switch point. If the acceleration to control movement of the actuator is changed once per sample, then the change from acceleration to deceleration or switch point would also have a granularity of one sample time. If this decision can be made only after the current actuator velocity exceeds the desired velocity, the switch from acceleration to deceleration may take place up to one sample time later than the desired time. This error is significant for short seeks, especially those taking 10 samples or less in deceleration. This error can nearly be eliminated by making the desired time to switch fall on a sample time.

SUMMARY OF THE PRESENT INVENTION

In accordance with this invention, a servo system employing feed forward is provided utilizing a seek algorithm which adapts to variations in seek conditions from the ideal, such as electrical or mechanical disturbances affecting one or more components of the servo system, thereby allowing the system of this invention to follow the desired velocity profile more closely.

An additional feature of the present invention is that from the beginning of a seek operation, by allowing a controlled increase in the deceleration required to reach the target velocity, the desired velocity profile can be attained at the desired sampling instant rather than later than desired as in the prior art. That is, by allowing a controlled increase to the deceleration required by the velocity profile, the value of the deceleration at its next sample time can be commanded.

BRIEF DESCRIPTION OF THE DRAWINGS

FIGS. 2A-2D are graphs showing different aspects of actuator motion during track seeking operation employing a parabolic velocity profile in a disk drive servo system;

DESCRIPTION OF THE PREFERRED EMBODIMENT

Figure 1:
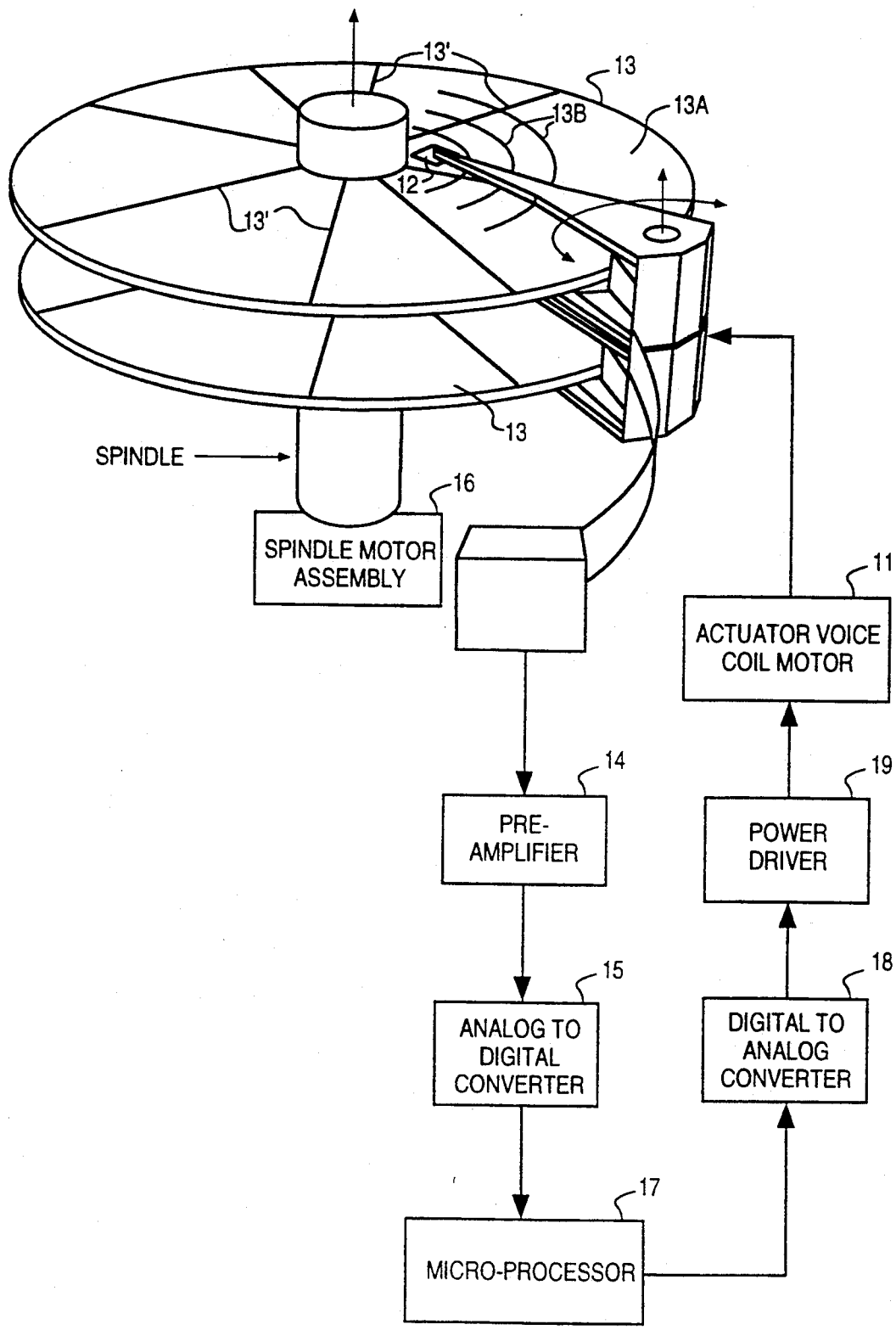
FIG. 1 is a block diagram showing a portion of a disk drive system in which the present invention may be employed.

Referring to FIG. 1, there is shown a pair of recording disks 13 which are rotated by a spindle motor assembly 16 and which contain a recording medium on at least one surface 13a of each disk. At least one head 12 is associated with each recording surface 13a, and heads 12 are movable as a unit, as indicated by the arrows, by an voice coil actuator motor 11 to different radial or track positions 13b on surfaces 13a. Each of surfaces 13a is divided into a plurality of sectors, represented by sector boundary lines 13', each of which, as is well known in the art, contains on each track a servo portion and a data portion.

The servo portions have recorded therein information for identifying the cylinder or track number, clock synchronizing signals and servo burst pattern signals which, when decoded by means of pre-amplifier 14 and analog-to-digital converter 15, provide a signal which may be processed to generate an indication of the position of the head relative to the track centerline. Each data portion of a sector following the servo portion contains user data which may be read and recorded under control of a host computer (not shown).

The intelligent part of the servo system is commonly implemented in a microprocessor 17 which calculates the actuator control acceleration, at least once per sample of information read from the tracks on disks 13 during a seek operation by using one or more mathematical algorithms in accordance with this invention. The calculated value of the control acceleration is then applied to control the voice coil actuator motor through a digital-to-analog converter 18 and a power driver 19.

In order to obtain optimal performance, microprocessor 17 typically employs separate algorithms for track seeking and track following operations. The algorithm utilized in the present invention applies only to track seeking operations.

In track seeking algorithms, it is common to use one or a combination of two or more velocity profile curves of different shapes. Each shape specifies a deceleration rate and has its own advantages. A parabolic velocity profile curve having a constant deceleration rate provides optimum move time, but may result in longer settling time. On the other hand, a linear velocity profile curve having a deceleration linearly decreasing with distance allows better control and results in faster settling time at the expense of a longer move time. A velocity profile having a deceleration rate in between these two, or any combination, can also be chosen. Although the present algorithm can be used with any of the above, the present description will be limited to parabolic and linear velocity profiles. Extension to the other cases can be easily made by one skilled in the art.

For ease of representation, the subsequent discussion assumes that all quantities increase from initial track towards final track and the following notations apply.

| | | |
|---|---|---|
| T | — — | sample time |
| k | — — | current sample |
| x, x(k) | — — | actuator position relative to the target track. The position at the target track is zero. The symbol in parentheses implies the corresponding sample. |
| v, v(k) | — — | actuator velocity. The symbol in parentheses implies the corresponding sample. |
| $v_{des}$ | — — | desired velocity for current position |
| $u_a, u_d, u_{ap}, u_{dp}, u_{dl}$ | — — | actuator control acceleration. The first subscript denotes acceleration (a) or deceleration (d), and the second, if present, the type of deceleration profile, parabolic (p) or linear (l) |
| $a, a_p, a_l$ | — — | required deceleration to reach the target accurately or suggested feed-forward. The subscript, if any, denotes the type of deceleration profile. |
| $\Delta a, \Delta a_p, \Delta a_l$ | — — | change in required deceleration in one sample. The subscript, if present, denotes the type of deceleration profile. |

Figure 3A:
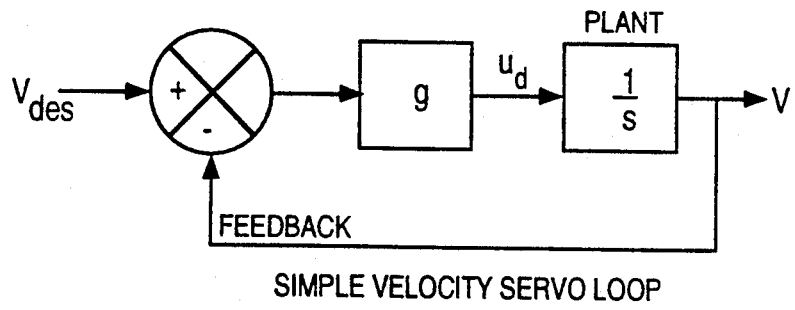
FIG. 3A is a schematic illustration of a simple prior art velocity servo loop during deceleration.
Figure 3B:
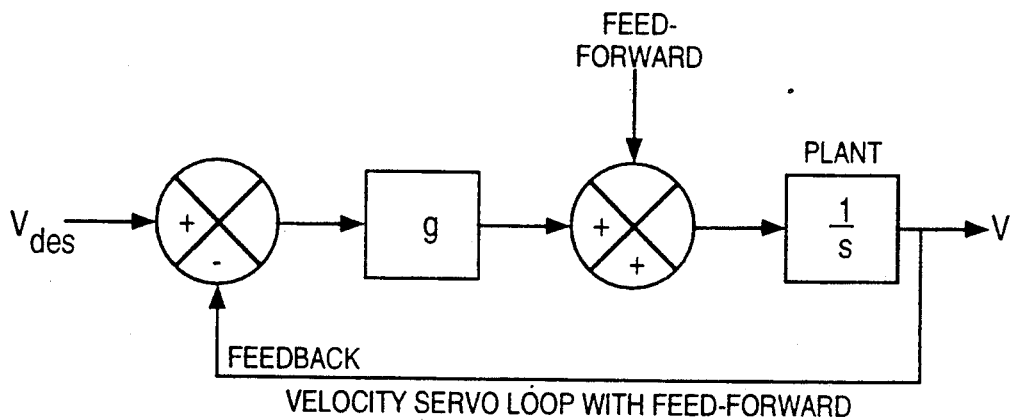
FIG. 3B illustrates a prior art velocity servo loop with feed forward.

In a track seeking operation, the goal of the deceleration phase is to arrive at the target track accurately while maintaining the actuator velocity close to the desired velocity profile. To accomplish this, a velocity servo loop with feed forward, similar to the one shown in FIG. 3B, is implemented. The value of feed-forward chosen is critical for the performance of the track seeking operation. The value of the feed-forward commonly chosen is the instantaneous slope of the desired velocity profile curve which is also equal to the instantaneous deceleration of desired velocity. Since it is only a characteristic of the desired velocity, it does not accommodate variations. This function is commonly left for the feedback.

Since the ultimate goal of the track seeking operation is to arrive at the target-track accurately, as stated above, system performance can be improved by designing the feed-forward for this purpose rather than just following the desired velocity profile curve. An optimum feed-forward would equal the deceleration required to reach the target with zero velocity, while following the deceleration characteristic of the desired velocity profile curve, in the absence of any external disturbances.

For a parabolic desired velocity profile curve which uses constant deceleration, the suggested feed-forward can be calculated from equations of motion with constant acceleration If $x_0$ is initial position, x is final position, $\dot{x}_0$ is initial velocity, $\dot{x}$ is final velocity and $\ddot{x}$ is acceleration, then $$\dot{x}^2 = \dot{x}_0^2 + 2\ddot{x}(x - x_0)$$

Substituting x(k) for initial position, 0 for final position, v(k) for initial velocity, 0 for final velocity and $a_p(k)$ for deceleration or suggested feed-forward, then $$0 = v^2(k) + 2a_p(k)[0 - x(k)] \quad (1)$$

$$a_p(k) = \frac{v^2(k)}{2x(k)}$$

Note that $a_p(k)$ is negative (which implies deceleration) because x(k) is negative in the present notation. The control acceleration during parabolic deceleration is, $$u_{dp}(k) = g[v_{des} - v(K)] + a_p(k) \quad (2)$$

If a linear desired velocity profile curve is chosen, the actuator velocity would decrease linearly with position until it reaches zero at the target track. If m is this constant rate of change of velocity.

$$m = \frac{v(k)}{x(k)}$$

If this trajectory is followed, at any time t during the remaining portion of the seek, the velocity v of the actuator is given by $$v = mx$$

Solving the above equations for x and v, $$x = m(k)e^{m(t-kT)}$$

$$v = v(k)e^{m(t-kT)}$$

Differentiating this last equation, the deceleration required or feed-forward $a_l$ can be determined, $$a_l = \frac{v^2(k)}{x(k)} e^{m(t-kT)}$$

Since this requires an exponentially varying control signal, it is not possible to implement in any sampled servo system. A linear velocity profile could be approximated by applying the required deceleration at the sampling instants. In that case, at sample k, the feed-forward would be, $$a_l(k) = \frac{v^2(k)}{x(k)} \quad (3)$$

Therefore, at sample k, the feed-forward for linear deceleration $a_l(k)$ is also negative (implying deceleration) because x(k) is negative in this notation. The control acceleration during linear deceleration is, $$u_{dl}(k) = g[v_{dese} - v(k)] + a_l(k) \quad (4)$$

The feed-forward for other deceleration velocity profile curves can also be derived in a similar fashion. Note that if the actuator velocity matches the velocity profile, the feed-forward utilized herein would be identical to that used in the prior art. However, if the actuator velocity has deviated from the velocity profile, as is most likely, the feed-forward being provided by the present invention would change, but it would not change in the commonly used prior art systems.

For time optimal seek performance, it is desirable that the acceleration phase of the track seeking operation end when the actuator velocity matches the desired deceleration velocity. In sector servo systems, it is likely that the actuator would attain the desired velocity between two sampling instants, thereby delaying the switch to deceleration up to one sample time.

During the acceleration phase of track seeking operation, the distance to the target continually decreases while the velocity of the actuator increases, resulting in increasing deceleration required to reach the target. In other words, as the actuator is accelerating, it requires a steeper and steeper velocity profile to reach the target. Overshooting the desired velocity profile would leave the actuator on a velocity profile steeper than the desired profile, thus requiring higher deceleration to reach the target. In some cases, it may exceed the maximum available deceleration, resulting in poor time performance.

From the beginning of the seek, at every sample, by controlling the increase in the required deceleration, it is possible to attain the desired velocity profile at a sampling instant. Since the feed-forward is equal to the required deceleration, this description will use the same notation and formula for required deceleration as well.

If a parabolic velocity profile is used, the required deceleration at the kth sample is, $$a_p(k) = \frac{v^2(k)}{2x(k)}$$

The change in this required deceleration in one sample is, $$\Delta a_p(k) = a_p(k+1) - a_p(k)$$

$$= \frac{v^2(k+1)}{2x(k+1)} - \frac{v^2(k)}{2x(k)}$$

$$= \frac{x(k)v^2(k+1) - v^2(k)x(k+1)}{2x(k)\,x(k+1)}$$

If the control acceleration at sample k is $u_{ap}(k)$, $$\Delta a_p(k) =$$

$$\frac{x(k)[v(k) + Tu_{ap}(k)]^2 - v^2(k)[x(k) + Tv(k) + \tfrac{1}{2}T^2 u_{ap}(k)]}{2x(k)[x(k) + Tv(k) + \tfrac{1}{2}T^2 u_{ap}(k)]} =$$

$$\frac{2Tx(k)v(k)u_{ap}(k) + T^2 x(k)u_{ap}^2(k) - Tv^3(k) - \tfrac{1}{2}T^2 v^2(k)u_{ap}(k)}{2x^2(k) + 2Tx(k)v(k) + T^2 x(k)u_{ap}(k)}$$

Neglecting the second and the fourth terms of the numerator and the second and the third terms of the denominator, $$\Delta a_p(k) = \frac{2Tx(k)v(k)u_{ap}(k) - Tv^3(k)}{2x^2(k)}$$

$$= T\frac{v(k)}{x(k)} u_{ap}(k) - T\frac{v^3(k)}{2x^2(k)}$$

From the above equation it is clear that change in the required deceleration can be controlled by the applied control acceleration $u_{ap}(k)$. In actual implementation, $\Delta a_p(k)$ would be supplied and $u_{ap}(k)$ would be calculated from the above equation as follows, $$u_{ap}(k) = \frac{x(k)}{Tv(k)} \Delta a_p(k) + \frac{v^2(k)}{2x(k)} \quad (5)$$

or, $$u_{ap}(k) = \frac{x(k)}{Tv(k)} \Delta a_p(k) + a_p(k)$$

If a linear deceleration profile is used, the formula for the control acceleration can be derived similarly. The control signal in this case would be, $$u_{al}(k) = \frac{x(k)}{2Tv(k)} \Delta a_l(k) + \frac{v^2(k)}{2x(k)} \quad (6)$$

or $$u_{al}(k) = \frac{x(k)}{2Tv(k)} \Delta a_l(k) + \frac{a_l(k)}{2}$$

At the start of a seek operation, required deceleration is allowed to increase in magnitude; therefore, the change in required deceleration, $\Delta a(k)$ ($\Delta a_p(k)$ or $\Delta a_l(k)$) is negative. Since x(k) is also negative, the first term in the above equations 5 & 6 is positive. From the earlier discussion, the second term in the above equations is negative. In addition, since v(k) is nearly zero and x(k) is the length of the seek, the first term is very large while the second term is nearly zero. As a result, at the start of a seek operation, the control acceleration is positive, implying acceleration phase. As the seek progresses, the first term decreases in magnitude and the second becomes more and more negative. Therefore, the resultant value of control acceleration decreases as the seek progresses. At the switch-point, the control acceleration becomes negative, starting deceleration. The control signal of the subsequent samples is generated using the deceleration algorithm discussed earlier.

Figure 4A:
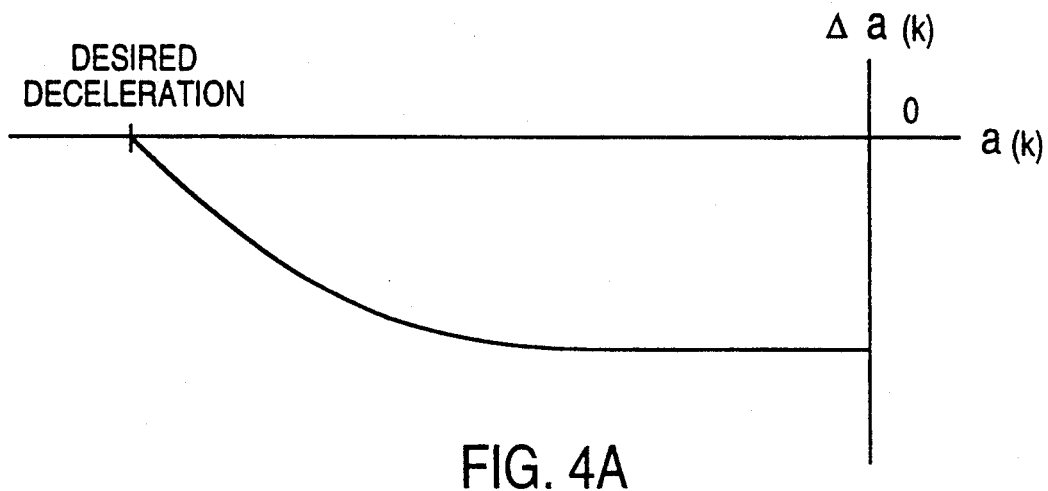
FIGS. 4A and 4B are representative plots of the change of the required deceleration vs. the required deceleration in the present invention.
Figure 4B:
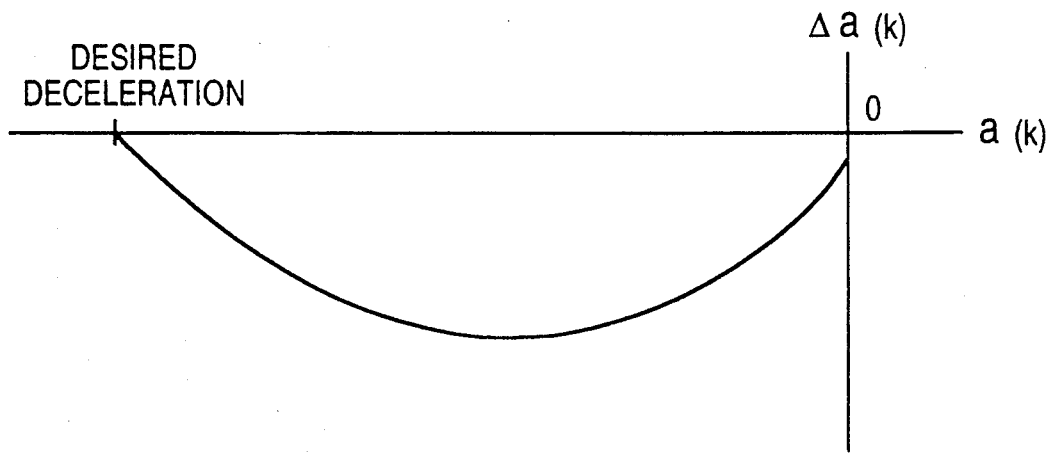

Although the present algorithm works satisfactorily with a constant value of $\Delta a(k)$, its performance can be improved by choosing it to be a function of a(k). FIGS. 4A and 4B show typical plots of this function. This method can easily be extended to other velocity profile curves and their combinations.

The present invention uses a velocity servo loop algorithm for the track seeking operation, but unlike other implementations, it does not always use the maximum available acceleration during the acceleration phase of the seek operation. Instead, less acceleration is used so that the desired velocity is attained at a sampling instant. Once the actuator velocity matches the desired velocity, it is easily controlled close to the desired velocity profile, resulting in better settling performance. The performance gain in settling more than offsets the loss in acceleration, thereby resulting in improved overall performance.

The following C-like code illustrates an implementation of the seek algorithm employed in the present invention for a parabolic deceleration profile.

| | SYMBOL DEFINITIONS |
|---|---|
| X | Actuator position relative to the target track |
| V | Actuator velocity |
| A | Required deceleration to reach the target track accurately |
| U | Control acceleration |
| G | Correction gain |
| DeltaA | Change in required deceleration in one sample, function of A |
| VDes | Desired velocity, function of X |
| FlagDecel | set to 0 in the beginning of seek indicating acceleration phase, set to 1 when deceleration starts |
| FlagDir | 0 for normal direction (X < 0 in the beginning of seek), 1 for reverse direction |
| MaxAccel | Maximum available acceleration |
| HardwareGain | Hardware acceleration unit conversion factor |

```
/* Make position and velocity direction independent */
if (FlagDir == 1)        /* Reverse direction */
{
  X = -X;
  V = -V;                /* Velocity is zero at start of seek */
}
/* Calculate required deceleration to reach the target accurately */
A = V * V / (2 * X);
/* separate code segments for acceleration and deceleration
   phases */
if (FlagDecel == 0)      /* Acceleration Phase */
{
  DeltaAVal = DeltaA (A); /* Call function DeltaA with parameter A
  */
  U = (DeltaAVal * X / V) + A;
  if (divide overflow condition)
  U = MaxAccel;          /* Maximum available acceleration */
  if (U < 0)
  FlagDecel = 1;         /* Start deceleration from next sample
  */
}
else                     /* Deceleration Phase */
{
  VDesVal = VDes (X);    /* Call function VDes with parameter X
  */
  U = G * (VDesVal - V) + A;/* G is correction gain */
}
/* Limit control acceleration to available acceleration range */
  if (U > MaxAccel)      /* Positive limit check */
  U = MaxAccel;
  else if (U < -MaxAccel) /* Negative limit check */
  U = -MaxAccel;
/* Apply control acceleration */
```

```
-continued
if (FlagDir == 0)
out (U * HardwareGain);
else
out (-U * HardwareGain);
/* End */
```

We claim:

1. A servo system for moving a member from a first position to a second position in a time optimal fashion, said system comprising motive means for moving said member, means for generating a velocity profile representing the variation of the desired velocity of said member in moving from said first position to said second position in a time optimal fashion, said velocity profile having an acceleration phase and a deceleration phase, the transition from said acceleration phase to said deceleration phase being identified as a switch point;

means for periodically sampling the velocity of movement of said member in a sequence of sample periods during movement of said member;

means for energizing said motive means during said acceleration phase and said deceleration phase;

means for controlling said energizing means to cause said switch point to occur during one of said sample periods;

means for applying a feed-forward signal component to said energizing means;

said feed-forward signal component being a measure of the deceleration required to follow said velocity profile;

means for controlling changes in said required deceleration during said movement;

said means for controlling changes in said required deceleration including means for applying a control acceleration to said energizing means; and said required deceleration (a) at any current sample (k) being $$a(k) = \frac{v^2(k)}{2x(k)}$$

where v is the velocity of said movement at said sample and x is the distance between said first position and said second position at said sample.

2. A servo system in accordance with claim 1 in which said control acceleration (u) is $$u(k) = \frac{x(k)}{2Tu(k)} \Delta a(k) + \frac{a(k)}{2}$$

where $\Delta a$ is the required change in deceleration (a) and T is the sample time.

* * * * *